Nov. 26, 1968 P. EISLER 3,413,439

ELECTRIC CIRCUIT CONNECTIONS

Filed May 26, 1965 6 Sheets-Sheet 1

Inventor
Paul Eisler
By
Watson, Cole, Grindle & Watson
Attys.

Nov. 26, 1968 P. EISLER 3,413,439

ELECTRIC CIRCUIT CONNECTIONS

Filed May 26, 1965 6 Sheets-Sheet 2

Inventor
Paul Eisler
By Watson, Cole, Grindle & Watson
Attys.

Inventor
Paul Eisler
By
Watson, Cole, Grindle & Watson
Attys.

Inventor
Paul Eisler
By
Watson, Cole, Grindle & Watson
Attys.

Inventor
Paul Eisler
By
Watson, Cole, Grindle & Watson
Attys

Inventor
Paul Eisler
By
Watson, Cole, Grindle & Watson
Attys.

United States Patent Office 3,413,439

Patented Nov. 26, 1968

3,413,439

ELECTRIC CIRCUIT CONNECTIONS

Paul Eisler, 57 Exeter Road, London NW. 2, England

Filed May 26, 1965, Ser. No. 458,913
Claims priority, application Great Britain, May 26, 1964, 21,688/64; Aug. 11, 1964, 32,665/64
19 Claims. (Cl. 219—213)

ABSTRACT OF THE DISCLOSURE

A space heating system for a plurality of rooms comprises large area, low voltage electric resistance films distributed over the internal boundary surfaces of the rooms, a transformer for supplying the films, accessible, thin, pressure contact interconnections whereby the films can be adapted to local conditions, and switching means on the secondary side, the interconnections and switch contacts being of such area that overheating is avoided. The interconnections may be a strip conductor held in contact by suitable means with the switching in series parallel either of the films or secondary on the transformer and may also involve a time sequence and be under thermostatic control, and the primary supply may be automatically opened during switching.

This invention relates to space heating systems in which a plurality of rooms are heated by means of large area electric resistance heating films operating on a low voltage derived from the secondary winding of a mains transformer. Such a transformer will usually supply a number of rooms, in which case it must be positioned outside at least one room which it supplies. But even if there were a separate transformer for one room, in general such transformer might need to be positioned outside the room it supplies. Thus the system will in general have a transformer supplying at least one room outside which it is positioned, and connections must be carried from the transformer to the heating films of such room or rooms, which since the voltage is low, have to carry correspondingly heavy currents, with consequent development of excessive heat if the connections are of inadequate size or the junctions (contacts) between the connections and the films or between one another are not of unusually low resistance. If the heating of individual rooms is to be controllable, such a system requires provision for control of the secondary supply to some prearranged grouping of heating panels or films, because any switching on the primary side of a transformer must affect all rooms supplied by the secondary of that transformer. Also since the heating panels themselves are desirably made up from standardised heating film material or units, the layout of the connections will depend on the size of the rooms, the distribution of the panels therein and the manner in which they are to be grouped electrically.

The present invention is particularly concerned with the construction of the connections in systems having the features set out above, in such a way that they can readily be suited to any desired grouping of films, both as regards switching and as regards the permanent connections. To this end according to the invention the connections are adapted firstly to permit instant connection and disconnection of any prearranged grouping of the heating films to the secondary voltage at will by at least one movable switch contact placed on a live link connecting to at least one of said group of heating films and secondly to permit the easy adaptation of said prearrangement to different local conditions by provision of readily accessible fixed pressure contacts to the individual heating films, both the movable and fixed contacts extending over such a large area with so many points of direct metal to metal contact that the heat generated by the large current passing through the contact resistance does not raise the contacts to a temperature above the maximum temperature to which the heating film is allowed to rise temporarily in the space heating system.

The switching operations may be no more than making and breaking the connection, i.e., "on" and "off" operations, but often some variation in distribution or amount of load or both will be provided for.

As regards the fixed connections, the provision of accessible fixed pressure contacts and easy adaptation to local conditions facilitates the installation of a space heating system using standardised material. This applies not merely to provision of larger or smaller areas of heating film according to the size of room, but in addition the provision of different schemes and groupings, thus rendering the system flexible notwithstanding the use of standardised material.

The invention will be further described with reference to the accompanying diagrammatic drawings, in which.

Figure 4:
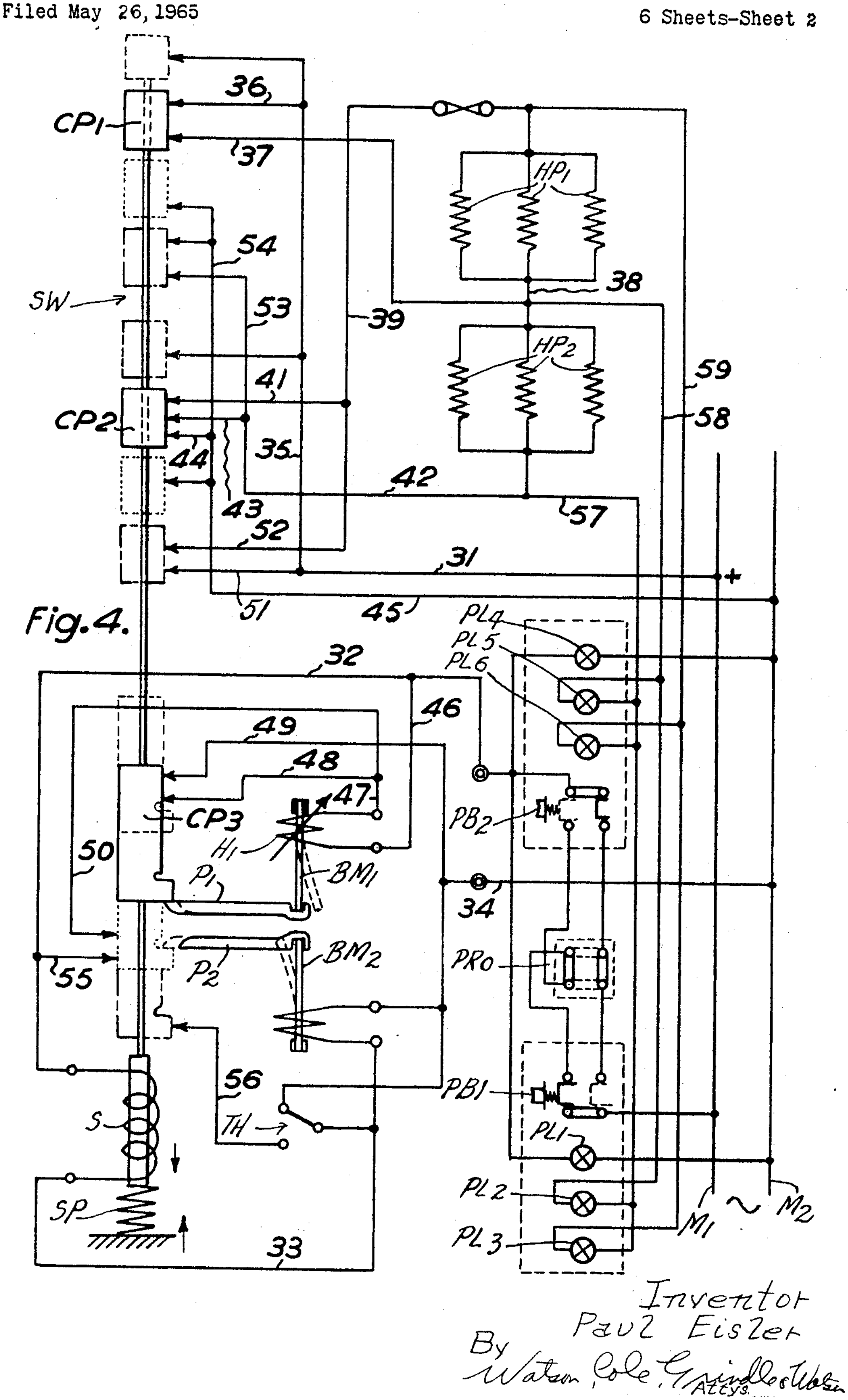
FIGURE 4 is a circuit diagram showing how the switching can be arranged to connect groups of heating films in parallel for a preliminary short period and then automatically connect them in series, control then being maintained by a thermostat, a remote overriding manual control also being provided.
Figure 4A:
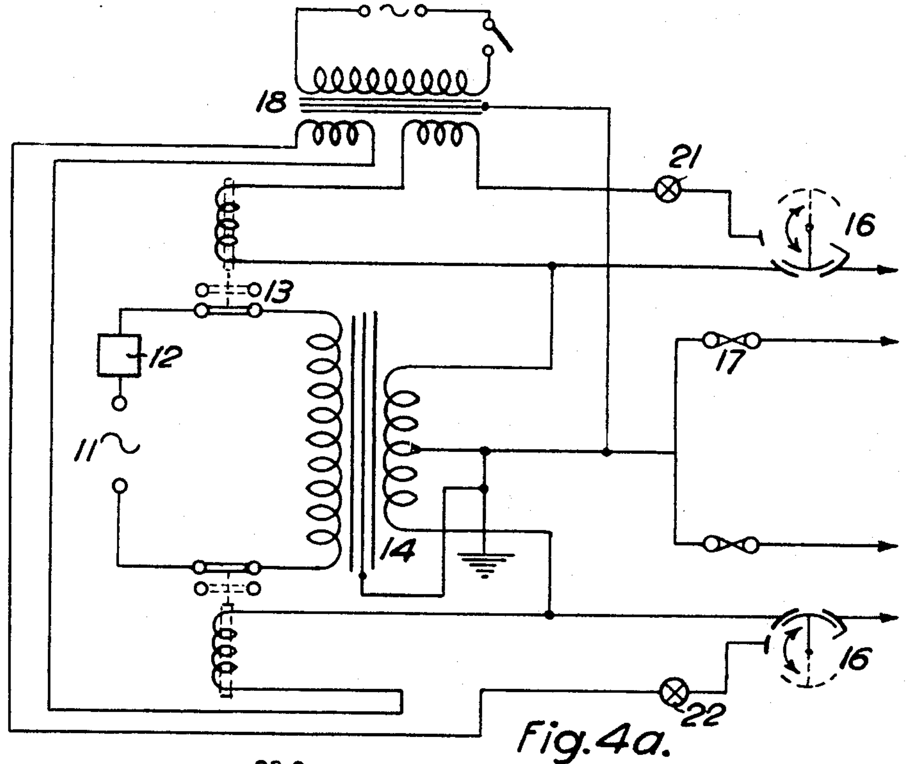
Figure 4B:
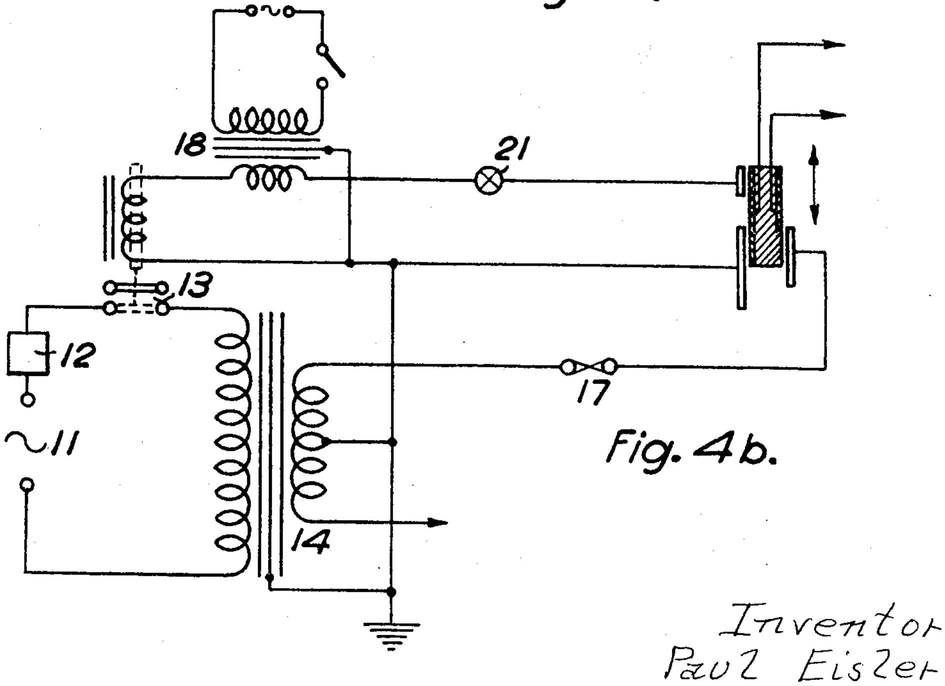

FIGURES 4*a* and 4*b* show other circuit arrangements;

FIGURES 5 to 9 illustrate the making of the fixed connections of the heating system.

Figure 1:
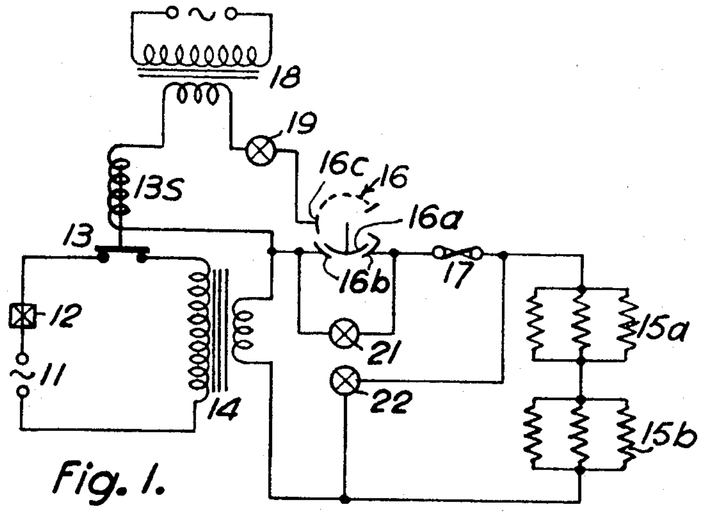
FIGURES 1, 2 and 3 are circuit diagrams showing switching "on" and "off" of the heating films.

FIGURE 1 shows a simple "on-off" control by means of a switch equipped with means to ensure that during the actual switching operation the secondary voltage is cut off from the switch. A supply drawn from alternating current mains 11 is connected through a circuit breaker 12 and solenoid operated switch 13 to the primary winding of a transformer 14 of sufficient size to cope with the maximum heating load which may come on it. In this example two groups 15*a*, 15*b* of heating film in series represent the load, which is connected to the secondary winding of the transformer 14 through a switch 16, the circuit also including a fuse 17 for protection. The physical construction of the switch 16 is not part of the invention. It must have contacts of a sufficient area and pressed together when it is closed under sufficient pressure to ensure that it will not overheat under the maximum load it has to carry, in particular its temperature will not rise above the maximum to which the heating film is allowed to rise temporarily in the heating system, this value being one which is selected by designer or the installer of the system as being appropriate to the particular installation or type of installation.

The switch 16 is here shown as a rotary switch comprising a moving contact 16*a* connecting with two fixed contacts 16*b* which are included in one of the leads from the transformer secondary to the load 15*a*, 15*b* which is a live link when the switch is closed. The switch is shown closed and it can only be opened by a half turn clockwise as seen in FIGURE 1. From open position it can only be closed by a half turn counterclockwise. To cut off the secondary voltage when the switch is actually being closed or opened an auxiliary contact 16*c* is provided, positioned so that during opening of the switch the contact 16*a*, while it is moving and while it is still across the contacts 16*b*, touches the contact 16*c*; then during closing the contact 16*a* touches the contact 16*c* before the contact 16*a* bridges the contacts 16*b* and only thereafter leaves the contact 16*c*. When the contact 16*a* touches the contact 16*c* it closes the secondary circuit of a small auxiliary transformer 18 through the solenoid 13*s* which operates the switch 13. If desired this secondary circuit may include a rectifier so that the solenoid is D.C. excited and therefore less likely to be noisy. Excitation of the solenoid causes the switch 13 to be opened thus opening the mains supply to the transformer 14 so that there is no secondary voltage across the circuit of the secondary of the transformer 14 when the switch 16 is actually being opened or closed. Desirably a signal device such as a lamp 19 is included in the circuit of the solenoid to give an indication when the circuit is temporarily closed during the movement of the switch 16. So that the operator may know whether the switch 16 is closed or open, two signal lamps 21, 22 are provided. The first 21 is across the switch 16. Thus it is by-passed and does not glow when the switch 16 is closed, but does glow when the switch 16 is open. The current passed by the lamp in series with the films is so minute that no perceptible heat is produced in the films. The second lamp 22 is across the load on the load side of the fuse 17. It therefore glows when the switch 16 is closed and does not glow when this switch is open or if the fuse blows. Both lamps 21, 22 are extinguished when the secondary voltage is cut off at 13 and the lamp 19 glows.

Figure 2:
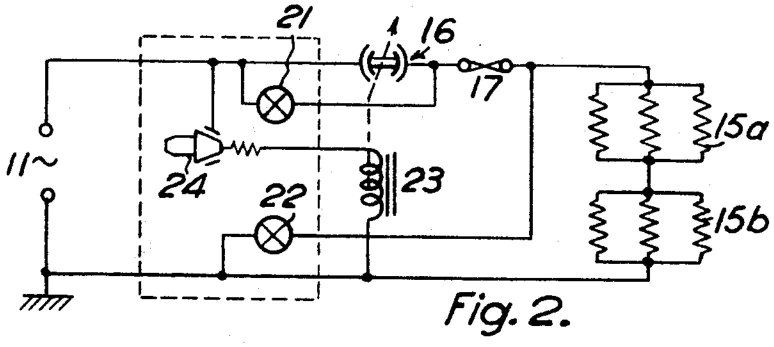

The circuit of FIGURE 1 assumes direct manual operation of the switch 16 which would be located near the door of the room in which the heating films constituting the load are located. FIGURE 2 shows how a remote control can be provided instead or in addition. These parts which are the same as or correspond to those in FIGURE 1 bear the same references and need not be described. To simplify the drawing the transformer 14 is not shown, nor the arrangement for effecting switch of the load under no secondary voltage conditions, but which can be exactly as in FIGURE 1. The additional units comprise a solenoid 23 the core of which is mechanically linked by any suitable known mechanism to rotate the switch 16 from one position to the other each time it is momentarily excited. It is shown supplied from the same circuit as the load and controlled by a push button switch 24 located at the desired remote point. Since the secondary voltage is cut off when the switch 16 is moving, the mechanism linking the solenoid 23 to the switch 16 should have enough inertia or store enough energy, e.g., in a spring, to ensure that the switch 16 is turned through the correct angle. Alternatively a supply for the solenoid 23 could be drawn from the secondary of the auxiliary transformer.

Figure 3:
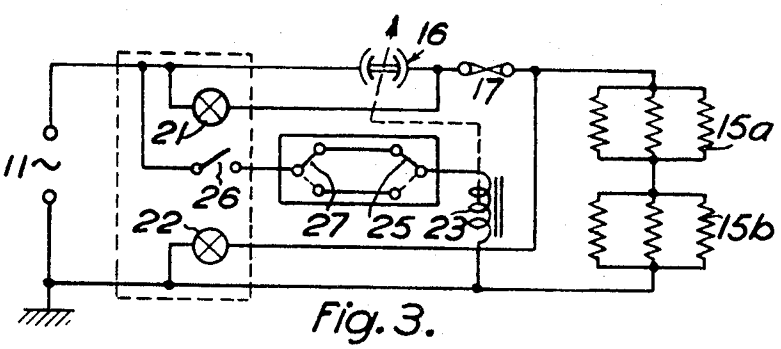

FIGURE 3 shows a circuit for control of the load by a device which senses some condition affected by the operation of the system, usually a thermostat, for example a thermostat which senses the temperature of the heated wall surface or the air temperature as may be desired. These parts which correspond to those of FIGURES 1 or 2 have the same references and need not be described in detail. Also for simplicity the transformer parts for no secondary voltage switching have been omitted.

As in FIGURE 2 the switch 16 is mechanically linked to the solenoid 23. Also operated by the same mechanism is a two way switch 25. Instead of the push button switch 24 for momentary contact, there is a switch 26 which when closed or opened remains as set. When this is on it provides a supply to a thermostat 27 which is of a type which moves a switch member over from one position to the other when a predetermined temperature is crossed. This movement switches the supply from the switch 26 to one or other contact of the switch 25. Assuming that the switches 26 and 16 are both closed, so that the heating films are being supplied but the temperature sensed by the thermostat is below the predetermined level, the thermostat and switch 25 will be so set that the circuit through the solenoid 23 is open. When the predetermined temperature is reached the thermostat changes over, closing the solenoid circuit so that the switch 16 is opened. At the same time the switch

25 is also changed over, thus breaking the solenoid circuit, but as before the mechanism has sufficient inertia or energy storage to ensure that the full movement is made. If the temperature again rises to the predetermined level, the change over of the thermostat will restore the supply to the solenoid but as before the excitation will only be momentary. The assembly thus ensures that each time the switch 16 needs to be actuated, the solenoid will be given a momentary excitation for the purpose. To avoid hunting the thermostat will be arranged so that on a rising temperature it changes over at a higher temperature than on a falling temperature. The temperature differential can be selected according to the condition of the particular type of installation, and if the installation has high thermal inertia a small differential can be selected.

In most cases more elaborate switching will be desirable; for example during an initial period of a few minutes a high heating rate obtainable by connecting two groups of films in parallel and thereafter a lower rate obtainable by connecting the two groups in series, this connection also being controlled by a thermostat which switches the supply on and off as needed. A circuit which will do this under overriding control by remote manual switches is shown in FIGURE 4.

In this figure the transformer is not shown, but it provides a low voltage supply to mains marked M1 and M2 from which a supply is drawn not only for the heating film groups HP1 and HP2 themselves but also for all control operations.

Manual control is effected through either of two switches PB1 and PB2. These are of press button type, momentary actuation changing the switch over from either of its two positions to the other. These switches are of a known type which enable a circuit to be made or broken from any of a number of switches; only two are shown but there is a junction box PRO which enables further switches to be introduced. This system being in itself well known need not be described further.

The supply to the groups HP1, HP2 is controlled by a main switch marked SW which comprises contact Plates CP1, CP2, CP3 on a rod carried by or otherwise actuated by the core of a solenoid S which when excited moves the assembly downward as seen in the figure against the action of a spring SP. The switch has four positions indicated for the several switch plates by dash lines, solid lines, dotted lines and chain lines respectively. The uppermost starting position to which the spring seeks to return the switch is an "off" position and in this position there is no supply to the films as may be seen by following the line 31 from main M1. The control circuit is also open at one of the switches PB1, PB2, the heaters H1, H2 of two bimetallic strips BM1, BM2 are off, these strips are in their full line positions and a change-over type thermostat TH is in the solid line position.

If now one of the push buttons is actuated, circuit is made from main M1 through line 32 to the solenoid S, thence by line 33 to the heater H2 and by line 34 back to main M2. The solenoid moves the switch S against spring SP until it is checked in the second position (that shown in the drawing) by a pawl P1 controlled by the strip BM1. The pawl P1 in this example is abutted by a downward extension of the plate CP3. In this position a circuit is completed from main M1, line 31, lines 35, 36, contact plate CP1, and line 37 to the junction point 38 of the two film groups, thence through group HP1 and lines 39, 41, and through group HP2 and lines 42, 43, contact plate CP2, and lines 44, 45 back to main M2. The groups HP1, HP2 are therefore connected in parallel across the supply. At the same time, the heater H1 is connected through lines 32, 46, 47, 48, contact plate CP3 and line 49 back to line 34. After a period of a few minutes the exact value depending on the resistance of the heater H1, the strip BM1 bends sufficiently (dotted line position) for the pawl P1 to release the contact plate CP2 and the solenoid S draws the switch assembly further downward through the third position to the fourth position. The resistance of the heater H1 is adjustable and it may be calibrated in minutes. During the period from first switching on the heater H2 has been in circuit and will therefore have bent the strip BM2 to the dotted line position, but owing to the shaping of the nose of pawl P2, the plate CP3 pushes past it, the elasticity of the strip BM2 permitting this. Once the switch has reached the third position, the pawl P2 springs forward again and the plate CP3 is so shaped that as long as the strip BM2 is bent, the switch cannot move back towards its first position, even if the solenoid supply is broken.

In the fourth position the supply to the heating films is through lines 31, 51, plate CP2, lines 52, 39, group HP1, group HP2, lines 42, 53, plate CP1, and line 54 back to line 45. The groups HP1 and HP2 are therefore now in series. The plate CP3 will now be out of contact with the lines 49, 48 and the heater H1 is switched off. If now the temperature sensed by the thermostat TH rises above a predetermined limit, the thermostat changes over from the solid line position to the dotted line position, the solenoid is by-passed by line 55, plate CP3 and line 56 to line 33 so that the solenoid is de-energised while the heater H2 remains in circuit. The spring SP therefore returns the switch assembly to the third position at which it is checked by the pawl P2. In this third position, the supply to the heating films is broken, as will be seen by following the lines 31, 35, 54. When the temperature falls against sufficiently for the thermostat to change back again to the solid line position, the by-pass path round the solenoid is broken again, the solenoid is re-energised and the switch is returned to the fourth position, re-establishing the supply to the film groups in series. It should be mentioned that in the third and fourth positions the heater H1 is shorted out by line 50, plate CP3 and line 55.

If now one of the switches PB1, PB2 is operated, the supply to line 32 is broken, the solenoid is deenergised and both heaters H1, H2 are deenergised. The return of strip BM2 to its straight position withdraws pawl P2, releasing the switch assembly when it reaches the third position under the action of the spring, it pushes past the pawl P1 the nose of which is shaped to allow this, and finally returns to the first "off" position.

To enable the conditions to be recognised at the switch stations, there are three indicator lamps at each. Lamps PL1 and PL4 at the respective switch positions are supplied from the line 32. This line is live when the control circuit is closed by the push button switches and opened when the control circuit is opened by these switches; when the film groups are connected in parallel, lamps PL2 and PL5 are energised over lines 57, 58 connected to the line 42 and junction point 38. When the film groups are in series there will only be half voltage across the lines 57, 58 so that the lamps PL2 and PL5 will not glow. In this position the lamps PL3 and PL6 are energised over lines 57 and 59, the latter being connected to the line 39 so that these lamps are under the total voltage across the groups.

In FIGURE 4 the voltage of the supply is constant and the loading is varied by series-parallel switching of two groups of heating films. It will be clear to those skilled in the art that a fixed connection of the heating film groups could be used and the loading varied by switch control of the voltage, i.e., of tappings of the secondary winding of the transformer. For example, the two halves of a secondary winding could be connected in series or parallel by a modification of the circuit of FIGURE 4.

FIGURES 4*a* and 4*b* illustrate other simple variations of FIGURE 1. Thus FIGURE 4*a* provides for separate switching of two groups supplied each by its own secondary winding, while FIGURE 4*b* shows the possibility of a plug connector which also ensures switching with the secondary voltage off.

Turning now to the fixed connections, various possibilities are shown in FIGURES 5 to 9. The films themselves are assumed cut from continuous material of standard width and of known, substantially uniform, resistance per unit length between terminal areas formed by bus bars along the side edge of the material. Such material is disclosed for example in my United States Patents 2,971,073, 3,020,378, 3,149,406, 3,283,284 and 3,317,657.

Figure 5:
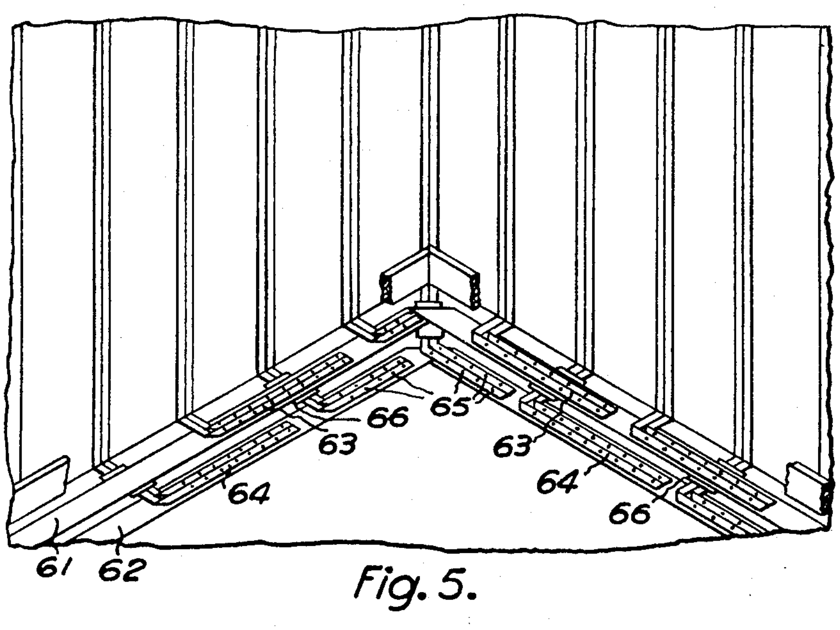

In all the present examples the bus bars of each single film width are connected with wide metal strips or foils supplying the films with current. In FIGURE 5 wide connecting strips 61, 62 are laid on the floor boards and the bus bar terminals 63, 64 are nailed or stapled at 65 to their upper side over a length of at least two strip widths. Underneath the nail heads or staples, preferably spring washers are used to ensure that the pressure contact remains elastic and lasting. Alternatively resilient staples are used which have their limbs deformed when driven in and thus ensure elastic pressure contact. The nailing or stapling above described holds the bus bars in good elastic pressure contact with the connecting strips over an adequate area for the purposes of the invention. At the same time these connections are easily and quickly made, the scheme is readily adaptable to local conditions, and can moreover be changed without great difficulty.

Figure 6:
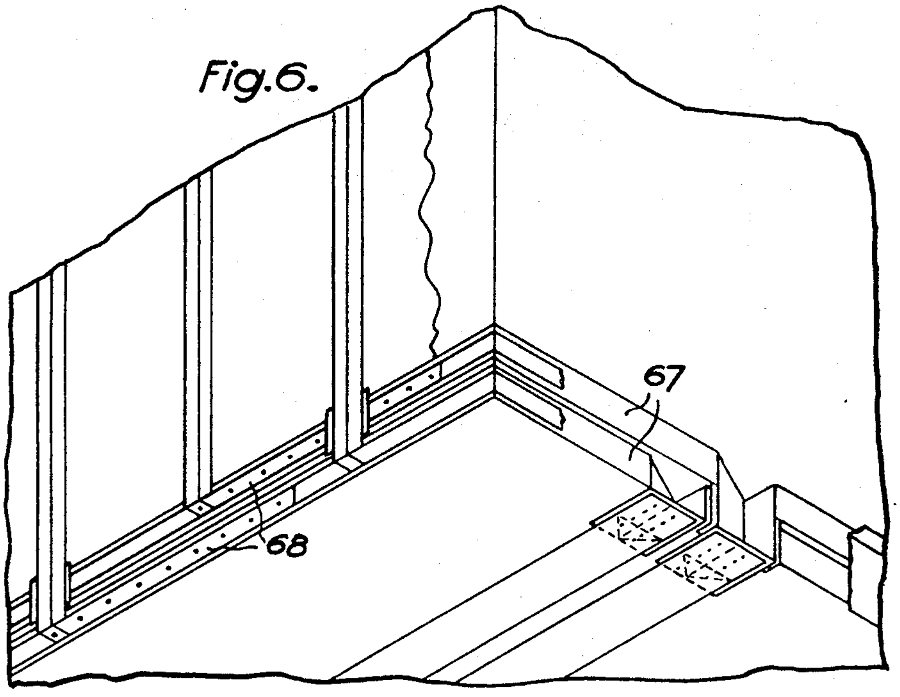
Figure 7:
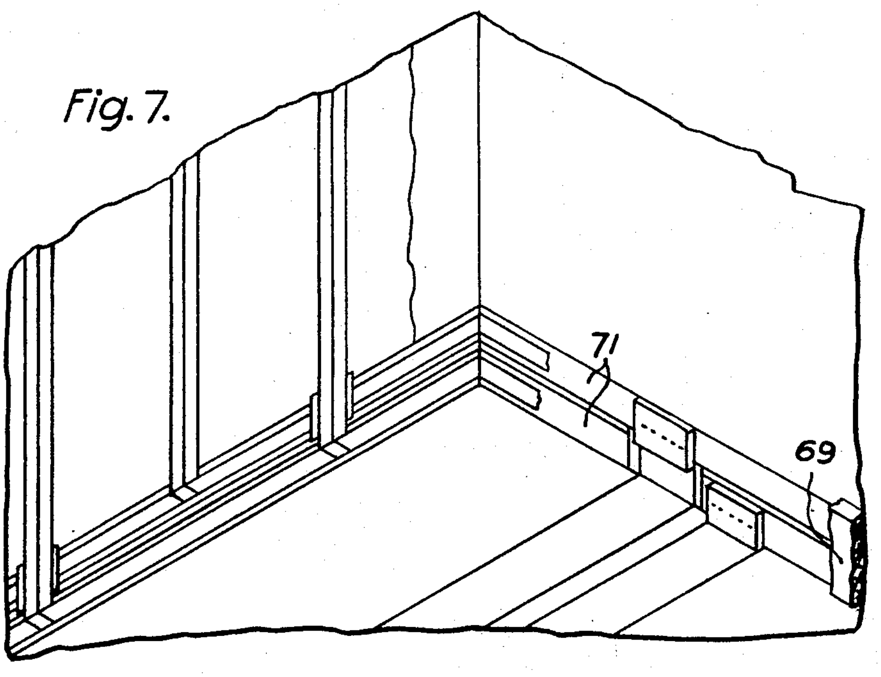
Figure 8:
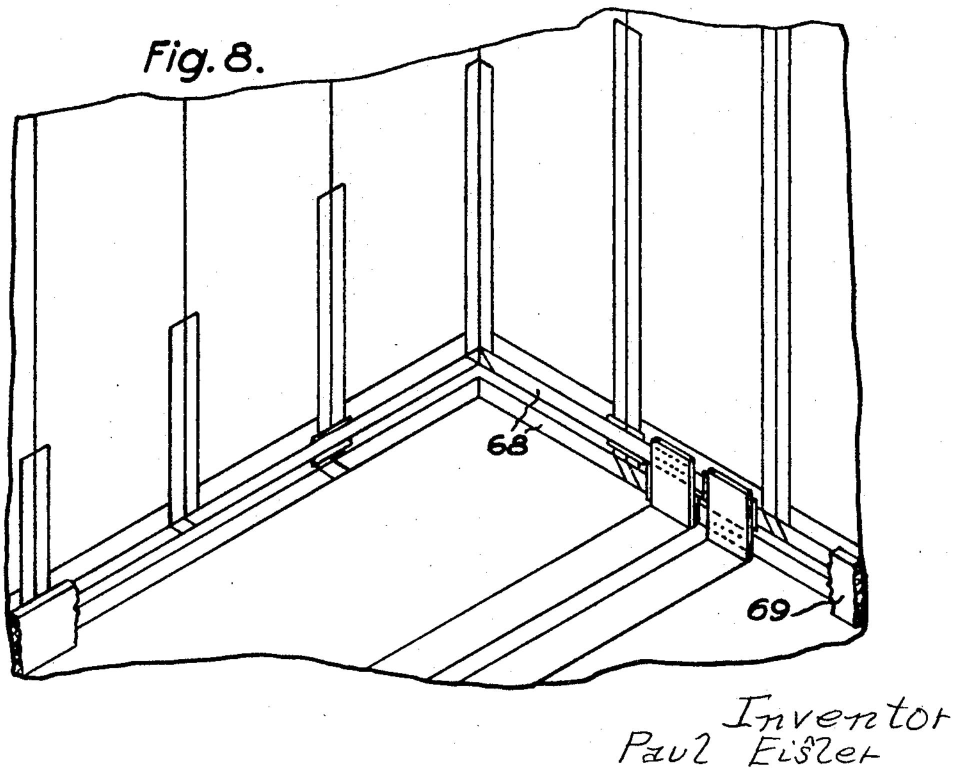

In FIGURE 6, use is made of foil strips 67 behind the skirting board to connect all the widths of film, the nailed bus bars being indicated at 68, and in FIGURE 7 the skirting board 69 itself contains at least two wide solid metal strips 71 to which all bus bar terminals can be readily joined and by which they are held under pressure all over the terminal area which as illustrated in FIGURE 8 can extend over more than two strip widths and involve the overlapping of these terminal areas. In order to ensure good contact the pressure areas may be crimped and/or padded by layers of metal wool or other elastic sheet material, nails are driven through the foils and the contact surfaces may be coated with a thin film of Electrolube, a synthetic lubricant, product by Electrolube Ltd., Slough/Bucks. which has a relatively high electrical conductivity (400 megohms per cubic centimetre). Fine graphite and abrasive particles may be added to the Electrolube when it is smeared on. Electrolube grease is preferred as contact lubricant. Instead of nails, screws may be used if preferred.

Figure 9:
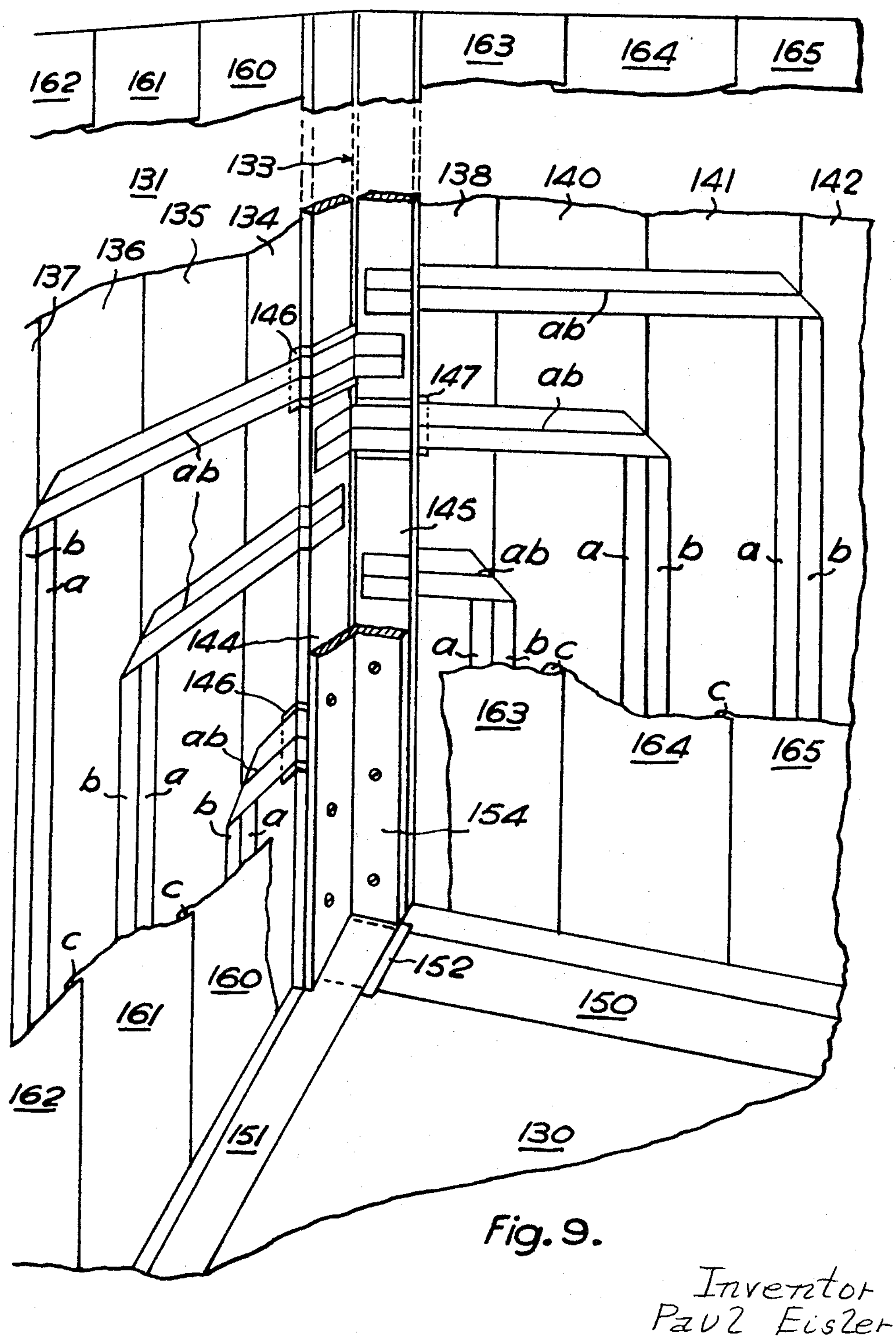

FIGURE 9 shows a manner of connecting the widths of heating film used as a heated wallpaper in which the joints are not on or near the floor. The room shown comprises a floor 130 and walls of which two adjacent walls 131, 132 are shown. The adjacent walls 131, 132 define between them a corner 133 of the room.

Attached to wall 131 are heating films of which four, 134, 135, 136 and 137 are shown. Attached to wall 132 are heating foils of which four, 138, 140, 141 and 142 are shown. The heating foils extend from the ceiling to the floor 130, and about one another such that they cover the whole of the wall surface. Each of the films is provided, along each of its edges, with bus bar strips *a* and *b*. Adjacent strips *a* and *b* of adjacent films contact one another to form conductors *ab*, and these are bent at right angles to their normal vertical orientations and are laid horizontally across the heating films towards the corner 133. Alternate conductors *ab* are connected to metal strip conductors 144, 145 respectively. Thus one strip *a* or *b* of each film is attached to conductor 144 and one strip *a* or *b* of each film is attached to conductor 145. Where conductors *ab* cross conductors 144 to reach conductor 145, insulating foil 146 is provided to insulate the crossing members. Where conductors *ab* cross conductor 145 to reach conductor 144, insulating foil 147 is provided to insulate the crossing members.

Conductors 144 and 145 extend from the ceiling to the floor of the room and, at the floor 130, they are attached to foil connected strips 150, 151 respectively.

These foil strips are laid across the floor, extending along each of the walls 131, 132. The foil strips are connected to the positive and negative terminals of a DC supply or to the terminals of an AC supply which provides electric power for the films. The foil strips 150, 151 are separated by an insulating foil 152 where they cross and are covered by linoleum or carpeting without any special protection being required. Extending over and completely covering the conductors 144, 145 is an angle member 154 which is disposed in the corner 133 and is secured to the walls 131, 132 holding the conductors in place.

It will be appreciated that current supplied through foil strips 150, 151 will be fed to conductors 144, 145 and thus to the side of each heating film. Since each conductor *ab* is disposed at approximately the mid-height of the room, current entering each heating film is divided substantially equally, one half flowing to each half of each heating film.

Over the abutting heating films on each wall 131 and 132, wall paper is fixed. Consecutive strips 160, 161, 162 and 163, 164, 165 overlap one another, as shown at C. By overlapping the wallpaper strips, excess paper is provided to permit expansion of the wall covering material, upon being heated, and subsequent shrinkage, upon being cooled. With abutting papers, gaps may appear due to shrinkage of the material, and these spoil the appearance of the decorated wall.

There are various ways in which the widths of heating films shown in FIGURES 5 to 9 are connected to the supply and the large number of widths in any room permits them to be grouped in many combinations of series and parallel circuits so that the total heat exchange between the space and the boundary layers in any room can be adjusted or varied within a wide range. Widths located beneath openings (under windows, over doors) through which air flows into the space are preferably used to adjust the grouping of the full length widths by being connected in series with or in parallel to any group or combination of groups of widths. In all cases it will be understood that switching is affected by movable switch contacts placed in a live link of the supply conductors, examples of which have been described above.

FIGURES 5 to 9 show connecting strips to which all the film widths are connected in parallel. More elaborate schemes usually need more connecting strips. Series parallel arrangements as in FIGURE 4 would, however, only need one more connecting strip.

The films themselves may desirably be constructed and arranged so that the fixed pressure contacts can only be made when the films are extended. Generally they are made from material in the roll and must be unrolled for proper access to the bus bars.

In some cases it may be desirable to space the strip conductors from the boundary wall of the room to permit convection of air on both sides and in that case the wall surface behind any such conductor is preferably made thermally substantially non-reflecting. Also it may be desirable to make the pressure joints on lengths of the strip which are supported on separate nailable material.

I claim:

1. A space heating system for a plurality of rooms comprising large area electric resistance heating films operating on a low voltage derived from the secondary of a mains transformer, said transformer supplying at least one room outside which it is positioned, in which instant connection and disconnection of a prearranged grouping of said heating films to said secondary voltage can be effected at will by at least one movable switch contact placed in a live link connected to at least one group of heating films and in which said prearrangement to suit local conditions is effected by means of readily accessible, fixed, pressure contacts between thin conductive areas extending from the individual heating films, both the movable and the fixed contacts extending over such a large area with so many points of direct metal-to-metal contact that the heat generated by the large current passing through the contact resistance does not raise the contacts to a temperature above the maximum temperature to which the heating film is allowed to rise temporarily in the space heating system.

2. A space heating system according to claim 1 in which the switching operations enable at least one of the factors comprising (a) distribution and (b) amount of load to be varied.

3. A space heating system according to claim 1 so arranged that the voltage on at least one group is automatically changed within a preset time delay.

4. A space heating system according to claim 3 in which the time delay is produced by a thermally operated device.

5. A space heating system according to claim 2 in which the switching operations are automatically effected under the control of a wall thermostat.

6. A space heating system according to claim 2 in which the switching operation changes the output voltage of the transformer.

7. A space heating system according to claim 2 in which the switching operation changes the connection of at least some of the heating films from parallel connection to series connection.

8. A space heating system according to claim 1 in which the switching operations for a room are effected by remote controls from outside that room.

9. A space heating system according to claim 1 in which whenever the switching connection is changed, the supply to the primary winding of the transformer is broken before the switch changes over and is made again after the switch changes over, so that switching is effected with the secondary voltage cut off from the switch.

10. A space heating system according to claim 9 in which the making and breaking of the supply to the primary winding of the transformer is effected by an electrically operated auxiliary switch, the operation of which is effected by the closing of an auxiliary contact on the switch which controls the connection of the secondary winding to the films.

11. A space heating system according to claim 10 in which the control circuit of the auxiliary switch includes a signal device indicating the condition of the auxiliary switch.

12. A space heating system according to claim 1 in which at least one pole of the supply to any one film is connected approximately at the centre of the length of the film.

13. A space heating system according to claim 1 in which at least one pole of the supply to any one film is connected to the ends of the length of the film.

14. A space heating system according to claim 1 in which the leads to the films are by thin flat conductors extending across the width dimensions of the film and supported on material into which fastening means can be driven.

15. A space heating system according to claim 14 in which the supporting material is in the form of strips located at least near the corners where two walls of the room meet.

16. A space heating system according to claim 1 in which the films have elongated strip form terminals which overlap and make good surface connection under pressure against thin flat supply conductors, each overlap being equal to at least one width of a heating film.

17. A space heating system according to claim 1 in which the films are constructed and arranged so that the fixed pressure contacts can only be made when the film is in extended condition.

18. A space heating system according to claim 1 in which links taking a supply to a plurality of films are of thin flat strip form and are spaced from the boundary wall of the room to permit convection of air on both sides.

19. A space heating system according to claim 18 in which the wall surface behind any link is thermally substantially nonreflecting.

References Cited

UNITED STATES PATENTS

| | | | |
|---|---|---|---|
| 2,314,766 | 3/1943 | Bull et al. | 219—213 |
| 2,498,054 | 2/1950 | Taylor | 219—508 X |
| 2,533,409 | 12/1950 | Tice | 219—213 |
| 2,569,921 | 10/1951 | Cassidy et al. | 219—213 X |
| 2,569,961 | 10/1951 | Tidd | 219—213 |
| 2,889,991 | 6/1959 | Follansbee | 219—213 X |
| 2,971,073 | 2/1961 | Eisler | 338—212 X |
| 3,275,802 | 9/1966 | Vandivere et al. | 219—499 |

RICHARD M. WOOD, *Primary Examiner.*

C. L. ALBRITTON, *Assistant Examiner.*